United States Patent [19]
Nishimura

[11] Patent Number: 6,164,430
[45] Date of Patent: Dec. 26, 2000

[54] STOPPER CYLINDER

[75] Inventor: Akira Nishimura, Noda, Japan

[73] Assignee: SMC Kabushiki Kaisha, Tokyo, Japan

[21] Appl. No.: 09/247,541

[22] Filed: Feb. 10, 1999

[30] Foreign Application Priority Data

Feb. 10, 1998 [JP] Japan .................................. 10-028648

[51] Int. Cl.$^7$ .................................................. B65G 15/64

[52] U.S. Cl. ...................................... 198/345.1; 198/346.2

[58] Field of Search ............................... 198/345.1, 689.1, 198/463.3, 468.1, 346.2

[56] References Cited

FOREIGN PATENT DOCUMENTS

| | | |
|---|---|---|
| 64-39318 | 3/1989 | Japan . |
| 64-39319 | 3/1989 | Japan . |
| 4-30183 | 7/1992 | Japan . |

Primary Examiner—Kenneth W. Noland
Attorney, Agent, or Firm—Paul A. Guss

[57] ABSTRACT

A stopper cylinder comprises a lever holder for rotatably supporting a lever to be rotatable by a predetermined angle, a fastening pin member provided on a side surface of the lever, and a bracket rotatably supported on both side surfaces of the lever holder and provided with a guide section for guiding the fastening pin member.

8 Claims, 12 Drawing Sheets

STOPPER CYLINDER

BACKGROUND OF THE INVENTION

1. Field of the Invention

The present invention relates to a stopper cylinder which makes it possible to stop a conveyed workpiece and position it at a predetermined position by the aid of a lock mechanism.

2. Description of the Related Art

The stopper cylinder has been hitherto used, for example, in order that a workpiece, which is conveyed on a conveyer line provided with a plurality of roller conveyers or the like in an aligned manner, is stopped at a predetermined position.

That is, the stopper cylinder comprises a piston rod which is movable frontward and rearward in accordance with an energized action thereof, and a lever which is engaged with a forward end of the piston rod. The lever is allowed to protrude by a predetermined length upwardly from the conveyance plane of the conveyer line through the gap between the adjacent roller conveyers so that a conveyed object abuts against guide rollers provided on the lever. Thus, the stopper cylinder functions as a stopper for stopping the conveyed object.

The stopper cylinder concerning the conventional technique is disclosed, for example, in Japanese Laid-Open Utility Model Publication Nos. 64-39318 and 64-39319, and Japanese Utility Model Publication No. 4-30183.

Such a stopper cylinder concerning the conventional technique contains a shock absorber which functions to relieve the shock upon abutment of the lever against a workpiece. The stopper cylinder further comprises a lock mechanism for preventing the workpiece from being pushed and returned in a direction opposite to the conveyance direction by the buffering force of the shock absorber when the workpiece is stopped at a predetermined position, and avoiding restoration of the lever to smoothly ensure a stopped state of the workpiece.

However, the stopper cylinder relevant to the conventional technique as described above involves the following inconvenience concerning the locked state in which the lever protrudes upwardly from the conveyance plane for the workpiece to make it possible to stop the workpiece which is conveyed in a predetermined certain direction. That is, if the workpiece is conveyed in a direction opposite to the predetermined conveyance direction, the lever is not released from the locked state even when the workpiece abuts against the lever. For this reason, it is impossible to convey the workpiece in the opposite direction.

In other words, the following inconvenience arises. When an adjusting operation is performed before the conveyer line is automated by installing the plurality of roller conveyers to construct the conveyer line, the worker occasionally wishes to manually move the workpiece in the direction opposite to the previously established workpiece conveyance direction. In such a case, even when the workpiece, which is moved in the direction opposite to the predetermined conveyance direction, abuts against the lever of the stopper cylinder, the lever is not released from the locked state. Therefore, it is impossible for the worker to move the workpiece in the direction opposite to the conveyance direction.

SUMMARY OF THE INVENTION

A general object of the present invention is to provide a stopper cylinder which makes it possible to improve the degree of freedom of handling operation.

A principal object of the present invention is to provide a stopper cylinder which makes it possible to convey a workpiece in an opposite direction by smoothly canceling a locked state even when the workpiece is conveyed in the direction opposite to a predetermined conveyance direction.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
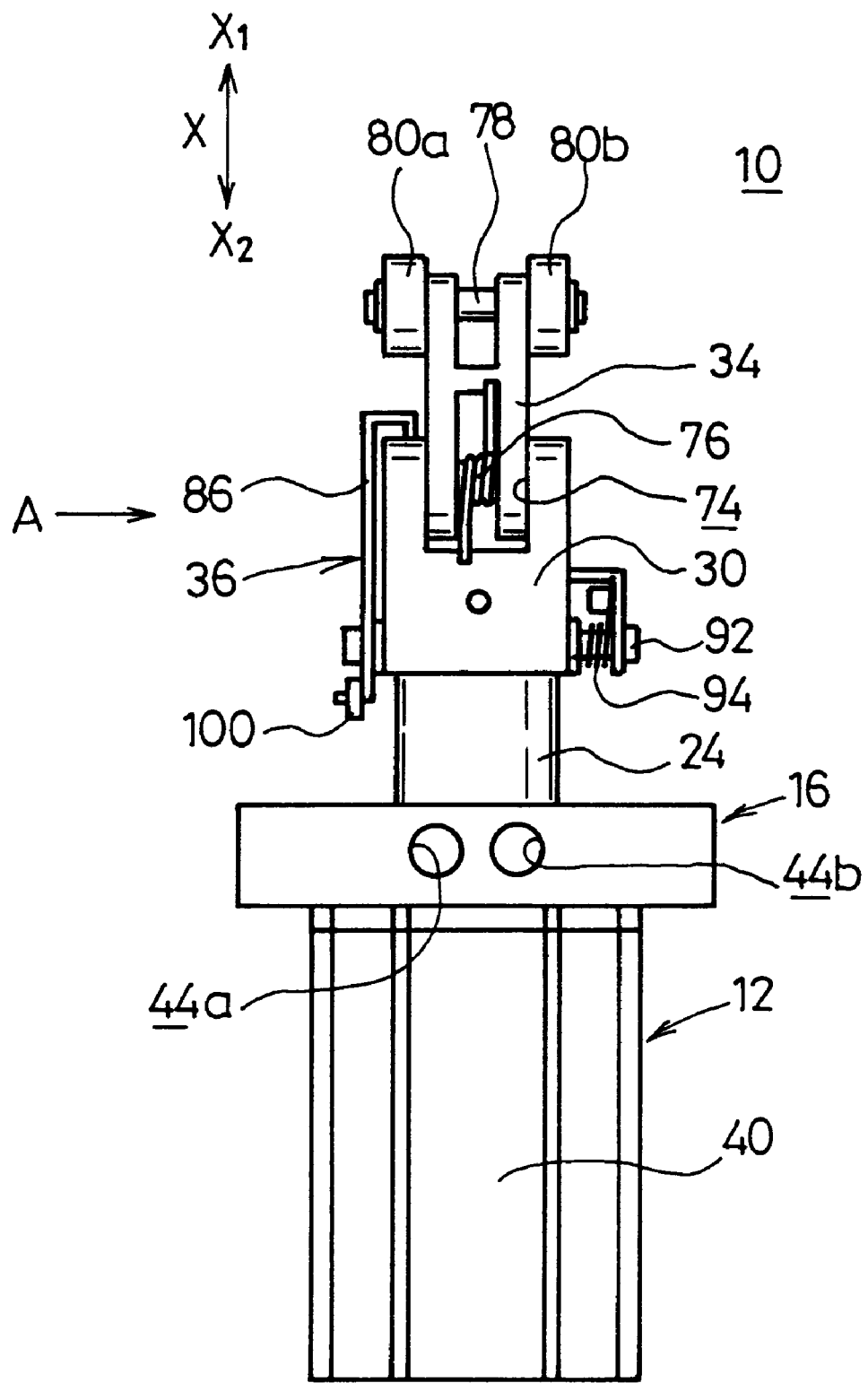
FIG. 1 shows a front view illustrating a stopper cylinder according to an embodiment of the present invention.
Figure 2:
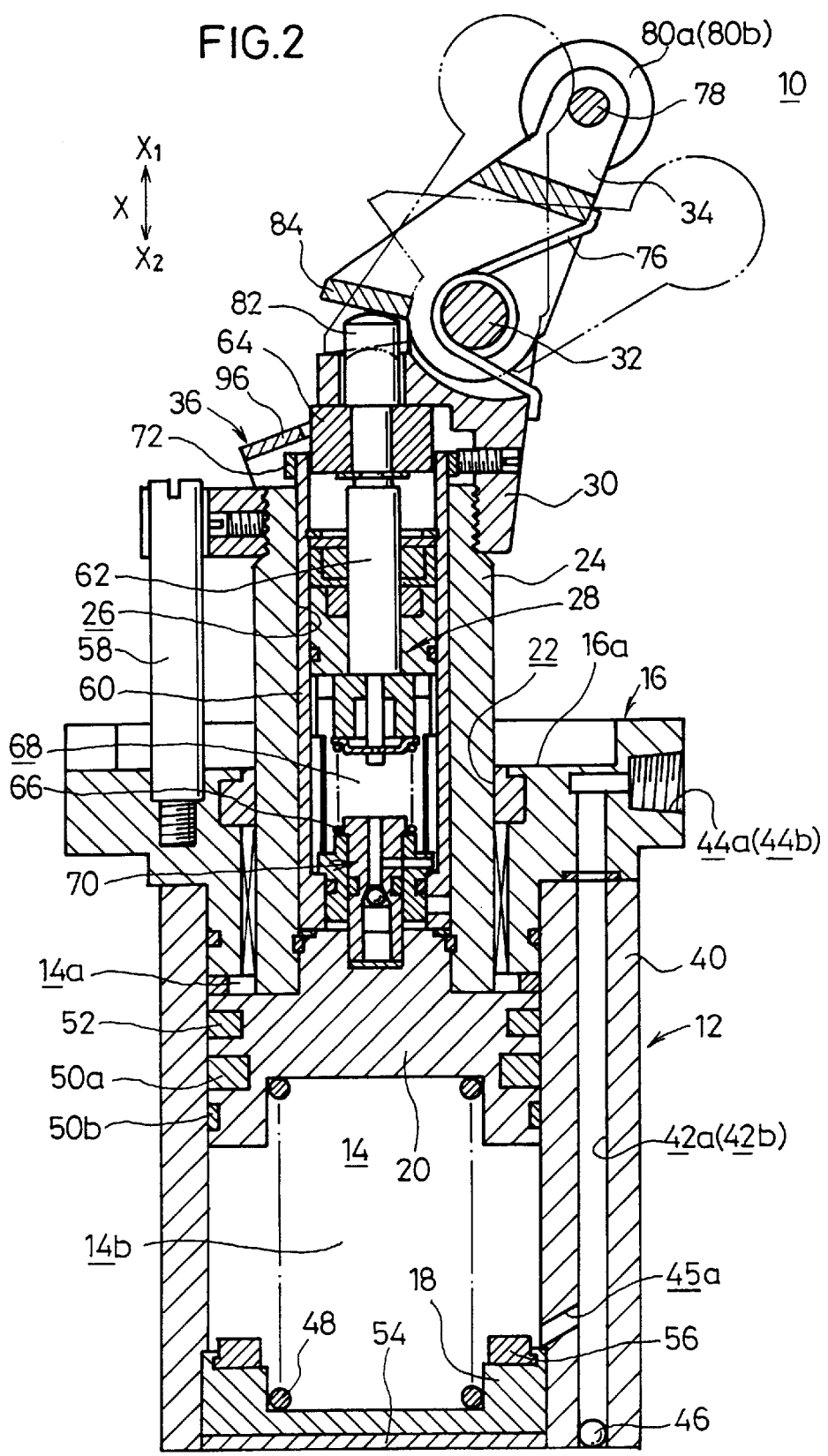
FIG. 2 shows a longitudinal sectional view taken along an axial direction of the stopper cylinder shown in FIG. 1.

With reference to FIGS. 1 and 2, reference numeral 10 indicates a stopper cylinder according to an embodiment of the present invention. The stopper cylinder 10 comprises a cylinder tube 12 having a hollow rectangular parallelepiped-shaped configuration, a rod cover 16 and a head cover 18 for closing openings at both ends of the cylinder tube 12 to substantially form cylinder chambers 14 (hereinafter referred to as "upper cylinder chamber 14a" and "lower cylinder chamber 14b", if necessary), and a piston 20 which is displaceable in a direction indicated by an arrow X along the cylinder chambers 14.

The stopper cylinder 10 further comprises a piston rod 24 which is coupled to the piston 20 to make displacement integrally with the piston 20 and which is exposed to the outside via a hole 22 formed through the rod cover 16, a shock absorber 28 which is internally fitted to a space 26 formed at the inside of the piston rod 24, a lever holder 30 which is fixed to an upper portion of the piston rod 24, and a lock mechanism 36 for fastening, at a predetermined position, a lever 34 which is rotatably supported on the lever holder 30 by the aid of a pin member 32.

Figure 3:
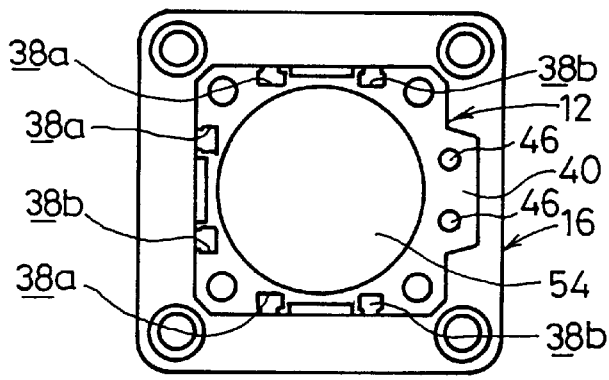
FIG. 3 shows a bottom view illustrating the stopper cylinder shown in FIG. 1.

As shown In FIG. 3, a pair of sensor attachment grooves 38a, 38b, which are substantially parallel to one another while being separated by a predetermined spacing distance, are formed along the longitudinal direction on each of three side surfaces of the cylinder tube 12. An unillustrated sensor may be installed at a predetermined position in the sensor attachment grooves 38a, 38b to detect the position of the piston 20.

As shown In FIGS. 2 and 3, a bulge 40 is formed along the longitudinal direction on one circumferential side surface of the cylinder tube 12 except for the three side surfaces described above. A pair of passages 42a, 42b, which are substantially parallel to one another along the longitudinal direction while being separated by a predetermined spacing distance, are formed through the bulge 40. First ends of the passages 42a, 42b are connected to make communication with a pair of pressure fluid inlet/outlet ports 44a, 44b which are formed in the rod cover 16 respectively. Second ends of the passages 42a, 42b are connected to make communication with the lower cylinder chamber 14b and the upper cylinder chamber 14a respectively via communication passages 45a, 45b (one of them is not shown).

Ports, which communicate with the passages 42a, 42b, are formed on the bottom surface of the cylinder tube 12. However, when the stopper cylinder 10 is used, for example, the ports are closed by plug members 46 such as steel balls.

As shown in FIG. 2, a spring member 48 is interposed between the piston 20 and the head cover 18, giving a state in which the piston 20 is always pressed upwardly (in the direction indicated by an arrow $X_1$) by the aid of the resilient force of the spring member 48. The piston 20 has, on its outer circumferential surface, annular grooves in which ring-shaped piston packings 50a, 50b and a magnet 52 are installed. The head cover 18 is fixed at the bottom surface of the cylinder tube 12 by the aid of a plate 54. A ring-shaped damper member 56, which abuts against the piston 20 to effect a buffering function, is provided on an upper surface portion of the head cover 18.

A guide rod 58 for guiding the shock absorber 28 and the lever holder 30 which are displaceable integrally with the piston 20 is screwed to an upper surface portion of the rod cover 16.

The shock absorber 28 comprises a cylindrical outer tube 60 which is internally fitted to the space 26 of the piston rod 24, a rod member 62 which extends along the axial direction of the outer tube 60 and which is displaceable along the direction indicated by the arrow X, and a ring member 64 which is provided on one end side of the outer tube 60 and which is fixed to the rod member 62. Known ones such as those of the pneumatic pressure type and the hydraulic pressure type may be used as the shock absorber 28.

In this embodiment, the buffering function is effected by integrally displacing the rod member 62 and the ring member 64 in a direction indicated by an arrow $X_2$ by the aid of the pressing action of the lever 34. An absorbing mechanism 70 is provided at the inside of the outer tube 60. The absorbing mechanism 70 is used to absorb the shock exerted on the rod member 62, in accordance with the cooperating action of the spring member 66 for pressing the rod member 62 upwardly and the pressurized oil (not shown) charged in a closed chamber 68. An adjusting ring 72 is fitted to the upper end of the outer tube 60. The adjusting ring 72 is used to arbitrarily adjust the buffering force of the shock absorber 28 by rotating the outer tube 60 in the circumferential direction.

The lever holder 30 is held by being screwed with respect to a threaded section of the piston rod 24. The lever 34, which is rotatable by a predetermined angle about the center of rotation of the pin member 32, is rotatably supported in a recess 74 (see FIG. 1) which is formed at a substantially central portion of the lever holder 30. A spring member 76 for restoring the lever 34 to its original position in accordance with the resilient force is wound around the pin member 32.

Figure 5:
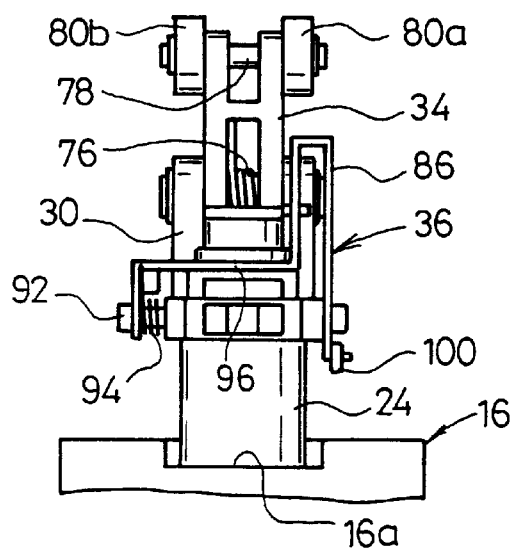
FIG. 5 shows a schematic view as viewed in a direction indicated by an arrow B shown in FIG. 4.
Figure 6:
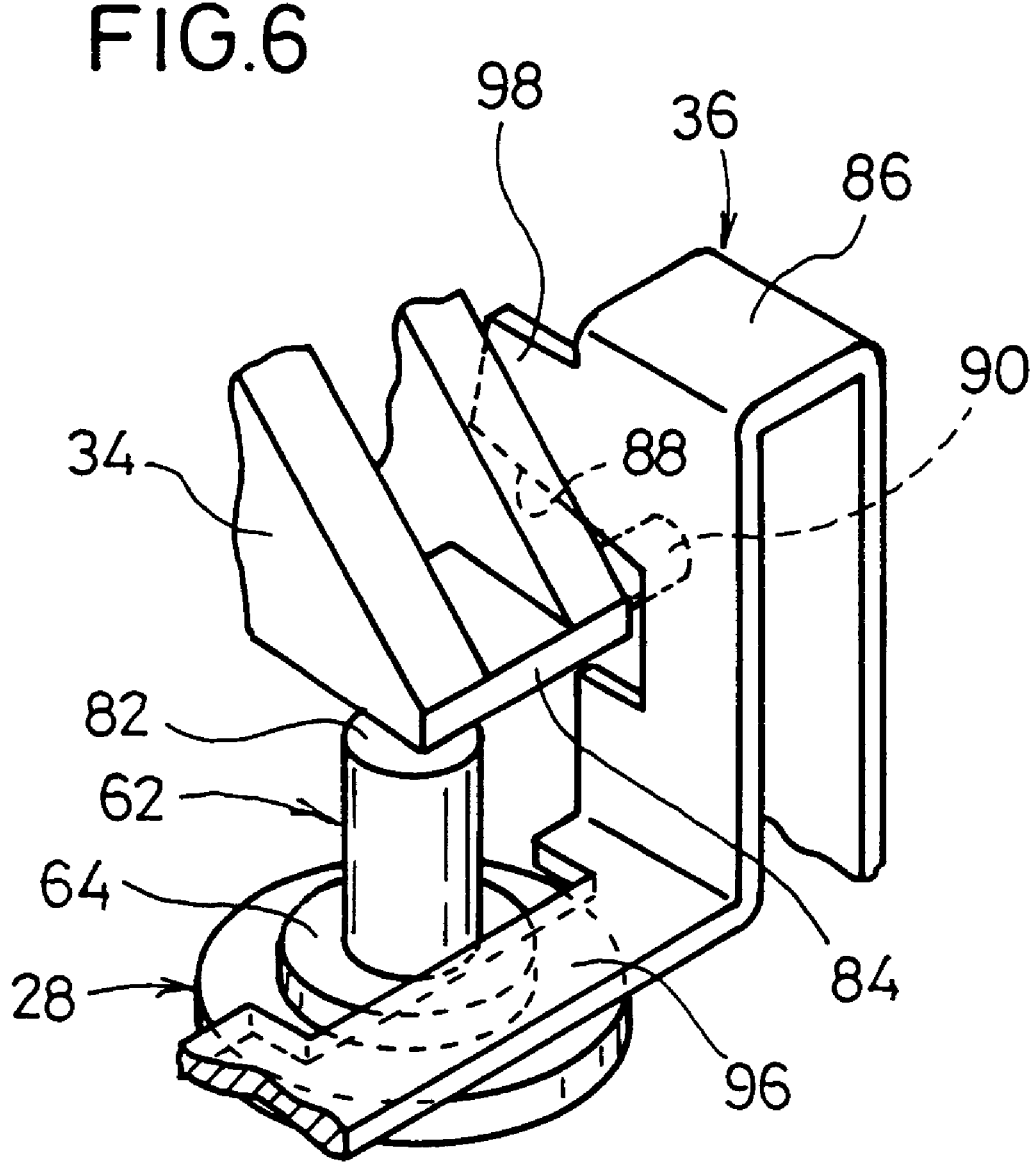
FIG. 6 shows a magnified perspective view of principal components illustrating a state in which a lever is locked.

As shown in FIG. 5, a pair of rollers 80a, 80b are rotatably supported on a pin member 78 at an upper portion of the lever 34 which has a substantially H-shaped configuration. On the other hand, as shown in FIG. 6, a planar section 84, which abuts against a forward end 82 of the rod member 62 of the shock absorber 28, is formed on the lower side of the lever 34. A fastening pin member 90, which is engageable with a guide section 88 of a bracket 86 described later on, is coupled to the side surface of the lever 34 adjacent to the planar section 84.

Figure 4:
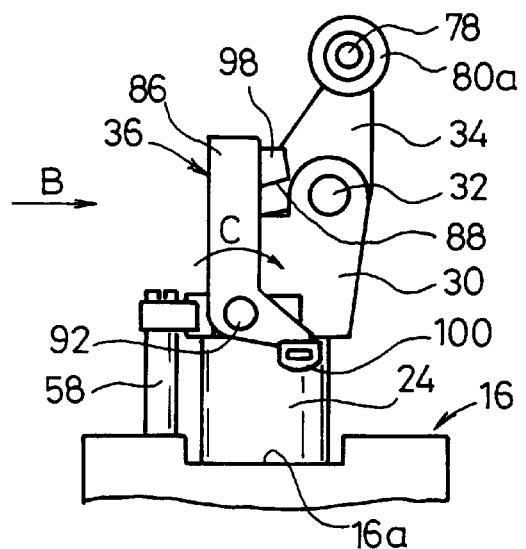
FIG. 4 shows a schematic view as viewed in a direction indicated by an arrow A shown in FIG. 1.

The lock mechanism 36 is formed by being bent to have an angular U-shaped cross section, and it Includes the bracket 86 which is rotatably supported by a pin member 92 through opposing both side surfaces of the lever holder 30 (see FIGS. 1, 4, and 5). The bracket 86 is in a state of being always urged in a direction indicated by an arrow C shown in FIG. 4 about the center of rotation of the pin member 92 in accordance with the resilient force of a spring member 94.

A flat fastening section 96 is formed at a substantially central portion of the bracket 86 (see FIGS. 5 and 6). In this embodiment, the bracket 86 is rotated by a predetermined angle about the center of rotation of the pin member 92, and the fastening section 96 of the bracket 86 fastens the ring member 64 of the shock absorber 28. Thus, the lever 34 is in the locked state. In other words, the fastening section 96 of the bracket 86, which is installed to the lever holder 30 by the aid of the pin member 92, holds the ring member 64 which tends to make displacement upwardly in accordance with the action of the resilient force of the spring member 66 when the shock absorber 28 is pressed downwardly. Thus, the locked state is established.

As shown in FIGS. 4 and 6, a projection 98, which protrudes toward the lever 34, is integrally formed at the bent portion of the bracket 86. A guide section 88, which contacts with the fastening pin member 90 coupled to the lever 34 to guide the fastening pin member 90, is formed at an edge of the projection 98.

An unlocking section 100, which abuts against the upper surface of the rod cover 16 when the piston rod 24 is lowered integrally with the shock absorber 28, is provided at one end of the bracket 86 (see FIGS. 1, 4, and 5). When the unlocking section 100 abuts against the upper surface 16a of the rod cover 16, then the bracket 86 is rotated in a direction indicated by an arrow D about the center of rotation of the pin member 92, and the fastening section 96 is separated from the ring member 64. Thus, the locked state is canceled (see FIGS. 17 and 18).

The stopper cylinder 10 according to the embodiment of the present invention is basically constructed as described above. Next, its operation, function, and effect will be explained.

Figure 7:
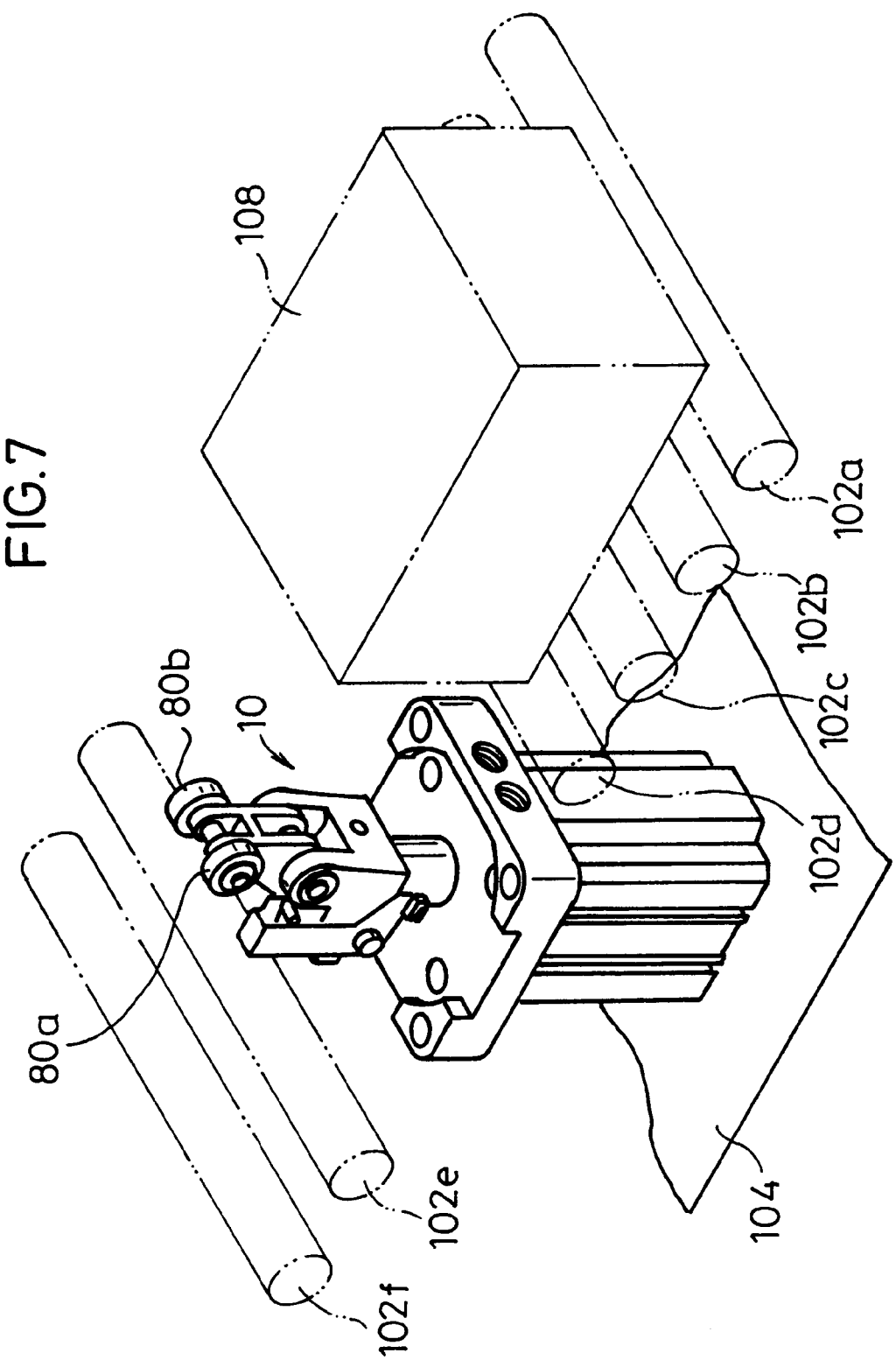
FIG. 7 illustrates a state in which the stopper cylinder is incorporated into a conveyance line.

At first, as shown in FIG. 7, the stopper cylinder 10 is fixed on a pedestal plate 104 so that the rollers 80a, 80b are positioned in a gap between adjacent roller conveyers 102d, 102e of a plurality of roller conveyers 102a to 102f for constructing a conveyance line. In such a state, the roller conveyers 102a to 102f are rotated in accordance with an energizing action of an unillustrated rotary driving source, and a workpiece 108, which is placed on a pallet 106 (see FIGS. 8 to 13), is conveyed in a direction indicated by the arrow. The pallet 106, on which the workpiece 108 is placed, is not shown in FIG. 7.

In this embodiment, an unillustrated pressure fluid supply source is connected beforehand via tubes or the like to the pair of pressure fluid inlet/outlet ports 44a, 44b formed in the stopper cylinder 10. The pressure fluid is introduced into the lower cylinder chamber 14b via the first pressure fluid inlet/outlet port 44a and the passage 42a in accordance with an energizing action of the pressure fluid supply source. Accordingly, the piston 20 is displaced in the direction of the arrow $X_1$ in accordance with the action of the pressure fluid.

Figure 13:
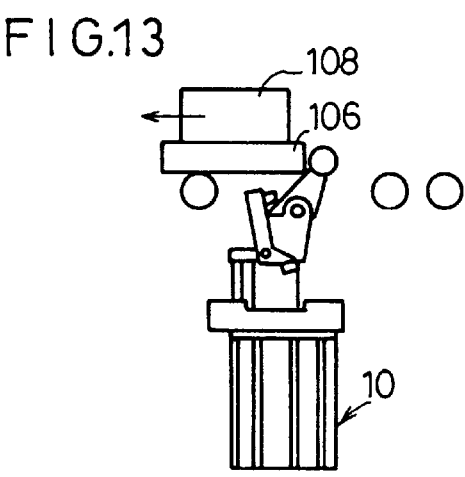
FIG. 13 illustrates a state in which the lever is restored to its original position after passage of the workpiece.

During this process, the shock absorber 28, which is contained in the space 26 of the piston rod 24, is raised integrally with the piston 20. The rollers 80a, 80b, which are rotatably supported at the upper end portion of the lever 34, are allowed to protrude by a predetermined length beyond the roller conveyers 102d, 102e. Thus, a waiting state is given as shown in FIG. 13. In the following description, explanation will be made by using the waiting state shown in FIG. 13 as the original position. In this situation, it is assumed that the lock mechanism 36 is in the unlocked state.

Figure 8:
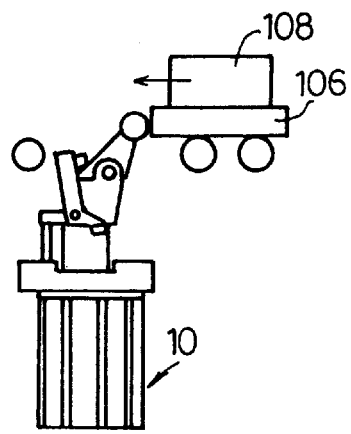
FIG. 8 illustrates a state in which a palette abuts against rollers of the stopper cylinder.
Figure 9:
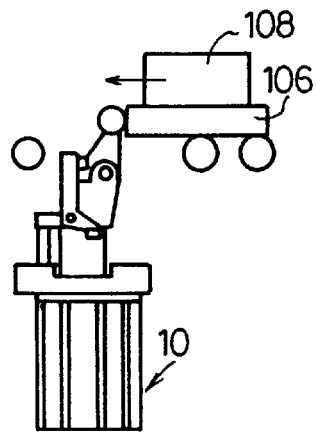
FIG. 9 illustrates a state changed from the state shown in FIG. 8, in which the rollers are pressed, and the lever is locked in a substantially upstanding manner.

During the process in which the workpiece 108 placed on the pallet 106 is conveyed in the direction of the arrow by using the roller conveyers 102a to 102f in the waiting state as described above, the pallet 106 collides with the rollers 80a, 80b which are provided at the forward end of the lever 34 (see FIG. 8). At this time, the lever 34 is rotated by a predetermined angle in a direction indicated by an arrow E (see FIG. 14) to press the rod member 62 of the shock absorber 28 downwardly. Thus, the shock, which is generated upon the collision with the workpiece, is absorbed by the shock absorber 28. Simultaneously, the lever 34 is locked in a state of being substantially perpendicular to the conveyance direction (see FIG. 9).

Figure 14:
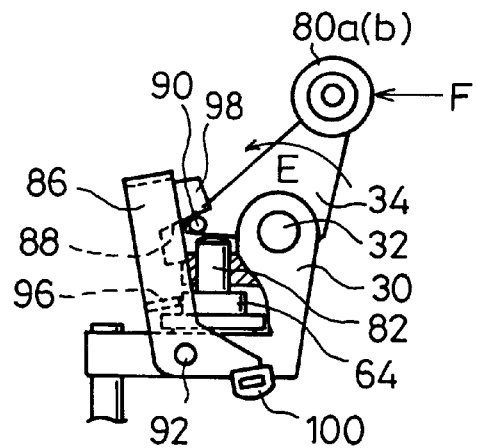
FIG. 14 illustrates a state in which the lever is rotated by a pressing force F of the workpiece while the lever is in an unlocked state.
Figure 15:
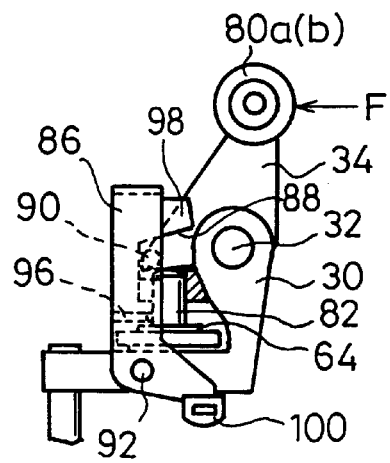
FIG. 15 illustrates a state in which the lever shown in FIG. 14 is rotated to make approach to a bracket.

That is, as shown in FIG. 14, the lever 34 is pressed in the conveyance direction by the pressing force F of the workpiece 108, and it makes rotational displacement by a predetermined angle in the direction of the arrow E about the rotational axis of the pin member 32. Thus, the lever 34 presses downwardly the forward end 82 of the rod member 62 of the shock absorber 28. During this process, the bracket 86 and the lever 34 cause rotational displacement in directions to make approach to one another in accordance with the guiding action of the fastening pin member 90 which slides along the guide section 88 of the bracket 86 (see FIG. 15). The bracket 86 makes the rotational displacement by the aid of the resilient force of the spring member 94, and the lever 34 makes the rotational displacement by the aid of the pressing force F of the workpiece 108.

Figure 16:
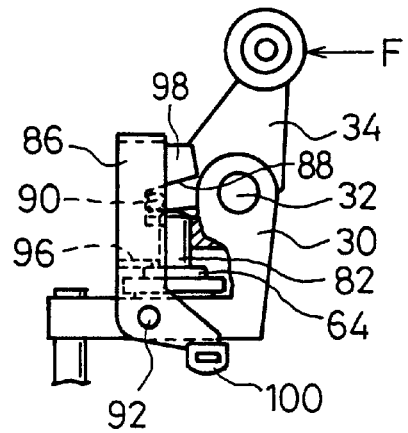
FIG. 16 illustrates a state in which the lever is locked by the pressing force F of the workpiece.

As shown in FIG. 16, the bracket 86 makes the rotational displacement by a predetermined angle about the center of rotation of the pin member 92 to give a substantially upstanding state. Thus, the ring member 64 of the shock absorber 28 is fastened by the fastening section 96 in a state of being pressed downwardly. Further, the lever 34 is locked in an upstanding state by engaging the fastening pin member 90 with the guide section 88 of the bracket 86.

The lever 34 is held in the substantially perpendicular state with respect to the conveyance direction as described above. Accordingly, the workpiece 108 is prevented from being pressed and restored in a direction opposite to the conveyance direction, which would be otherwise caused by the buffering force of the shock absorber 28. Further, it is possible to smoothly stop the workpiece 108 at a predetermined position.

Figure 10:
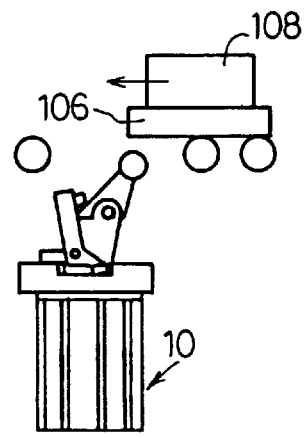
FIG. 10 illustrates a state changed from the state shown in FIG. 9, in which the lever is lowered, and it is unlocked.
Figure 11:
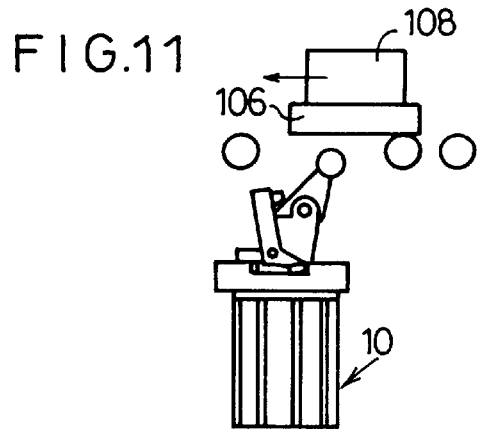
FIG. 11 illustrates a state in which the lever is lowered so that a workpiece passes thereover.
Figure 12:
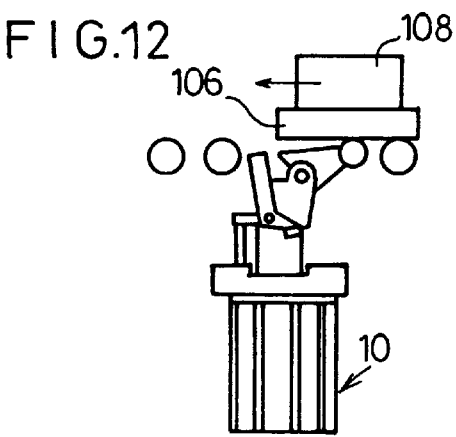
FIG. 12 illustrates a state in which the lever is raised, and the workpiece is moved along the rollers.
Figure 17:
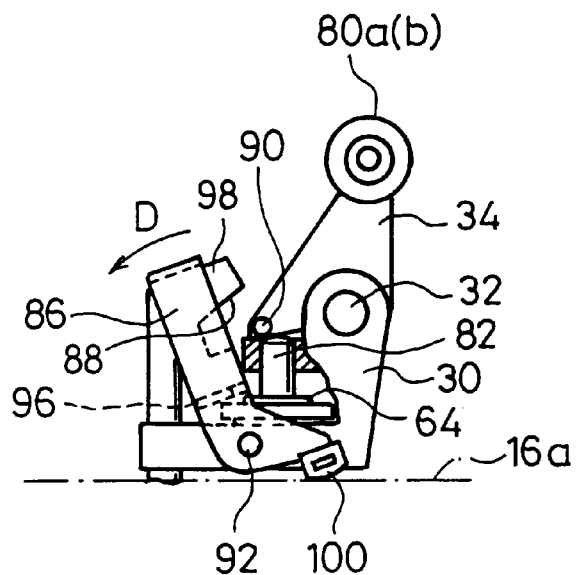
FIG. 17 illustrates a state in which an unlocking section abuts against an upper surface of a rod cover to rotate the bracket.

Next, the pressure fluid is supplied to the upper cylinder chamber 14a in accordance with the changeover action of an unillustrated changeover valve so that the piston 20 is displaced in the direction (direction of the arrow $X_2$) opposite to the above, and the shock absorber 28 is lowered integrally with the piston 20 (see FIG. 10). At the terminal end position of the stroke of the piston 20, as shown in FIG. 11, the rollers 80a, 80b are positioned downwardly by a predetermined distance from the conveyance line for the workpiece 108. As shown in FIG. 17, the unlocking section 100, which is provided at the lower end of the bracket 86, abuts against. the upper surface 16a of the rod cover 16, and thus the bracket 86 is pressed upwardly.

As a result, the bracket 86 makes rotational displacement by a predetermined angle about the center of rotation of the pin member 92. Accordingly, the fastening section 96 of the bracket 86 is disengaged from the ring member 64 of the shock absorber 28, and the fastening pin member 90 of the lever 34 is separated from the guide section 88. Thus, the lever 34 is released from the locked state (see FIG. 18). The release from the locked state allows the rod member 62 and the ring member 64 of the shock absorber 28 to rise in an integrated manner, and they are restored to the original position.

Next, the pressure fluid is introduced again into the lower cylinder chamber 14b via the pressure fluid inlet/outlet port 44a and the passage 42a in accordance with the changeover action of the unillustrated changeover valve in the state in which the lever 34 is unlocked as described above. Accordingly, the piston 20 is displaced in the direction of the arrow $X_1$. The rollers 80a, 80b, which are provided at the upper portion of the lever 34, abut against the bottom surface of the pallet 106 on which the workpiece 108 to be conveyed by the roller conveyers 102a to 102f is placed. Further, the rollers 80a, 80b are displaced substantially horizontally along the conveyance direction of the workpiece 108 (see FIG. 12).

Figure 19:
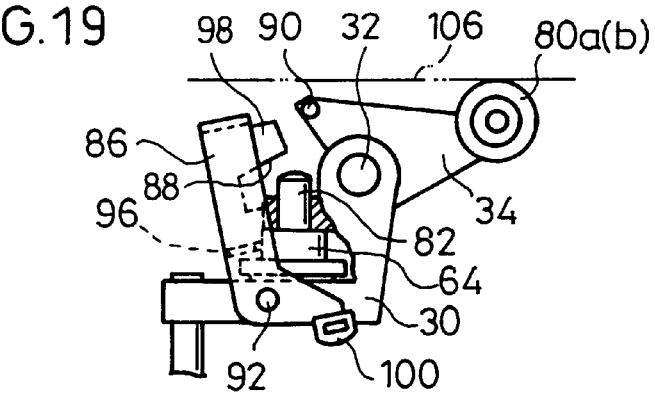
FIG. 19 illustrates a state in which the workpiece is moved along the rollers.
Figure 20:
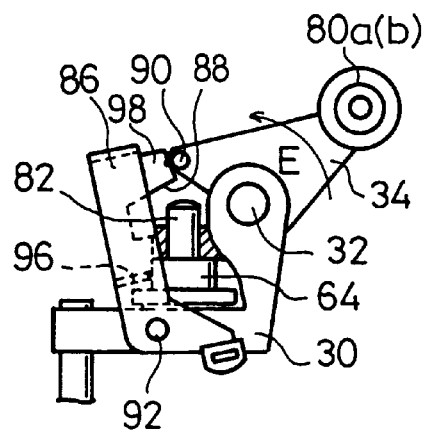
FIG. 20 illustrates a state in which the lever shown in FIG. 19 rises after passage of the workpiece.
Figure 21:
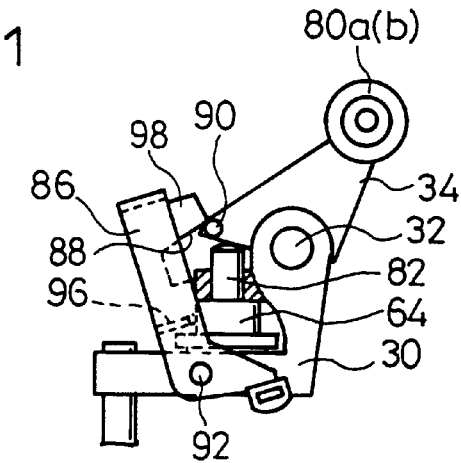
FIG. 21 illustrates a state in which the lever shown in FIG. 20 is unlocked, and it is restored to the original position.

Therefore, the workpiece 108 is conveyed in the predetermined direction by the aid of the roller conveyers 102a to 102f and the rollers 80a, 80b. As shown in FIGS. 19 to 21, after the workpiece 108 passes over the rollers 80a, 80b, the lever 34 makes rotational displacement in the direction of the arrow E by the aid of the resilient force of the spring member 76 wound around the pin member 32. Thus, the lever 34 is restored to the original state while being released from the locked state (see FIG. 13).

Next, explanation will be made for a case in which a worker manually moves the workpiece 108 in a direction opposite to the previously set conveyance direction of the workpiece 108, for example, in an adjusting operation before the conveyance line is automated after installing the plurality of roller conveyers 102a to 102f to construct the conveyance line.

Figure 22:
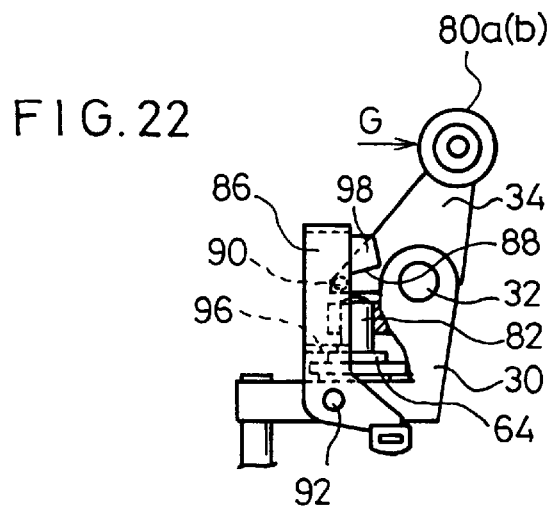
FIG. 22 illustrates a state in which a pressing force G is applied to the rollers in a direction opposite to the conveyance direction while the lever is locked.

In this case, it is assumed that the stopper cylinder 10 is set such that the rollers 80a, 80b, which are provided at the upper portion of the lever 34, protrude by the predetermined length from the conveyance line of the roller conveyers 102a to 102f, and the lever 34 is in the locked state as shown in FIG. 22.

Figure 23:
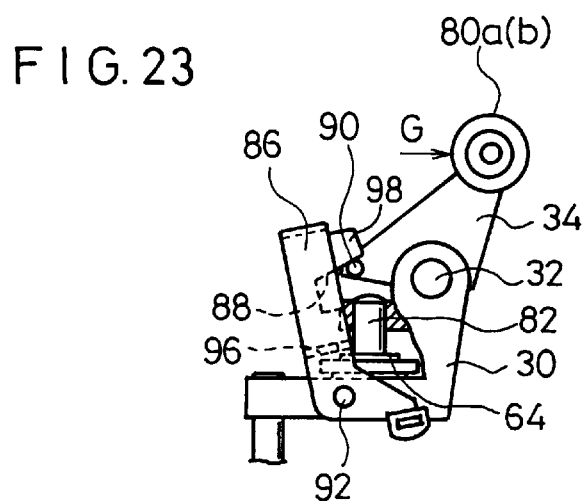
FIG. 23 illustrates a state in which the lever is rotated by the pressing force G shown In FIG. 22.

Starting from the state shown in FIG. 22, when the workpiece 108 is conveyed in the direction opposite to the conveyance direction, the workpiece 108 abuts against the rollers 80a, 80b to press the rollers 80a, 80b. The lever 34 makes rotational displacement by a predetermined angle about the center of rotation of the pin member 32 in accordance with a pressing force G on the rollers 80a, 80b applied in the direction opposite to the conveyance direction (see FIG. 23). During this process, the fastening pin member 90, which is provided on the lower side of the lever 34, is engaged with the guide section 88 of the bracket 86. The bracket 86 makes rotational displacement by a predetermined angle about the center of rotation of the pin member 92 in accordance with the guiding action of the guide section 88.

Therefore, the fastening pin member 90 of the lever 34 slides along the guide section 88 of the bracket 86, while the lever 34 and the bracket 86 cause rotational displacement in directions to make separation from each other. Accordingly, the fastening section 96 of the bracket 86 is disengaged from the ring member 64 of the shock absorber 28, and the fastening pin member 90 is released from the fastening action effected by the guide section 88 (see FIG. 24). As a result, the lever 34 is released from the locked state. Thus, it is possible for the worker to smoothly move the workpiece 108 in the direction opposite to the conveyance direction.

Figure 18:
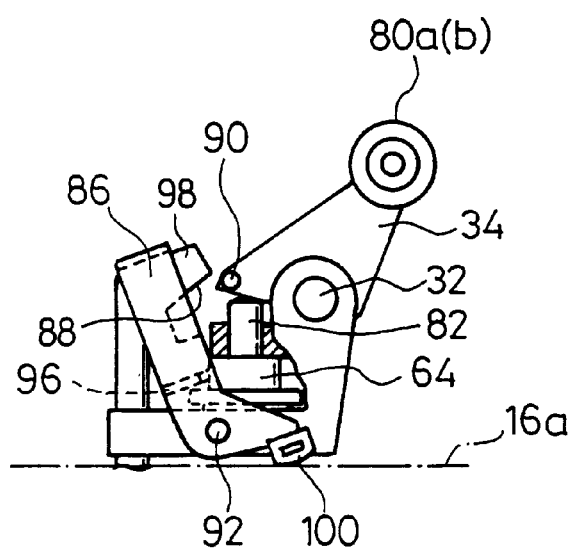
FIG. 18 illustrates a state in which the bracket shown in FIG. 17 is disengaged from a ring member, and the lever is unlocked.

As described above, in the embodiment of the present invention, in addition to the ordinary release from the locked state as shown in FIGS. 17 and 18, the lever 34 can be conveniently released from the locked state by using the pressing force G of the workpiece 108 which is moved in the direction opposite to the previously set conveyance direction. Therefore, it is unnecessary for the worker to every time confirm whether the lock mechanism 36 of the stopper cylinder 10 is in the locked state or in the unlocked state. It is possible to freely move the workpiece in the previously set conveyance direction and in the direction opposite thereto. As a result, it is possible to improve the degree of freedom of the handling operation for the stopper cylinder 10, and it is possible to smoothly carry out, for example, the adjusting operation before automating the conveyance line.

Figure 24:
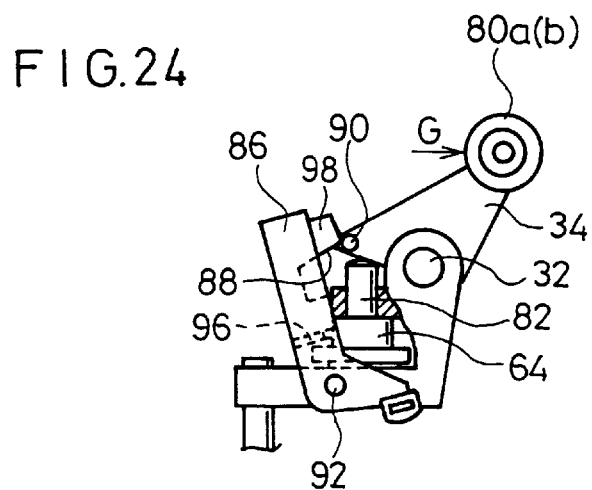
FIG. 24 illustrates a state in which the lever is unlocked by the pressing force shown in FIG. 23.

Further, in the embodiment of the present invention, after the lever 34 is released from the locked state by using the pressing force G of the workpiece 108 which is moved in the direction opposite to the previously set conveyance direction, the lever 34 is restored to the original position as shown in FIG. 24. Therefore, when another next workpiece 108 is moved in the conveyance direction, then the workpiece 108 abuts against the rollers 80a, 80b provided at the upper portion of the lever 34, and the workpiece 108 can be smoothly stopped by giving the locked state in accordance with the buffering action of the shock absorber 28. As a result, even when the worker cancels the locked state by moving the workpiece 108 in the direction opposite to the predetermined conveyance direction, the original function of the stopper cylinder 10 can be exhibited without any trouble for the next workpiece 108 which is moved in the conveyance direction.

For example, when two types of workpieces A, B (not shown) are successively conveyed by using the conveyance line, the worker sometimes intends that only the workpiece A is stopped at a predetermined position by using the stopper cylinder 10, and the workpiece B is allowed to pass through without being stopped by the stopper cylinder 10.

Figure 25:
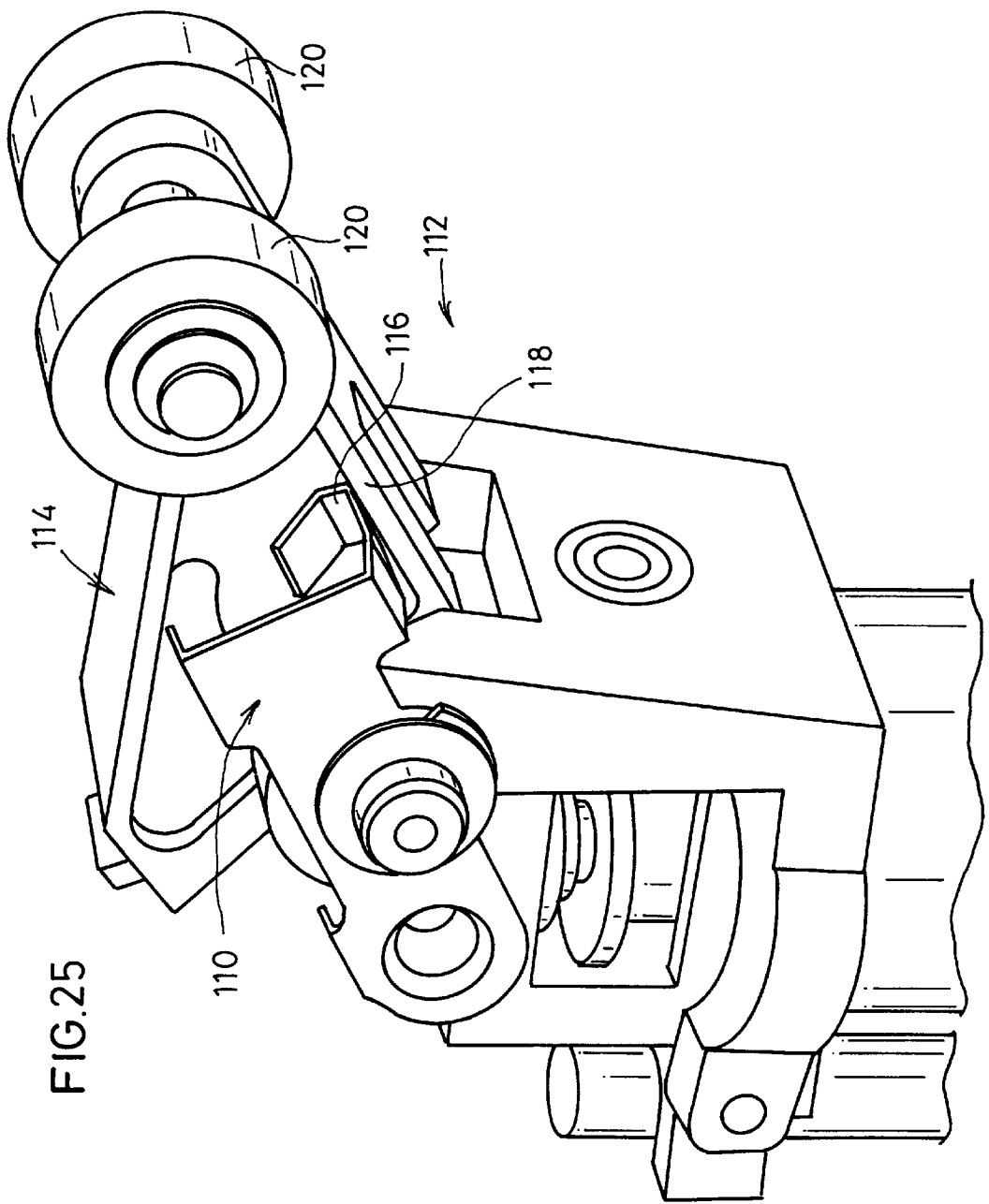
FIG. 25 shows a partial perspective view of a conventional stopper cylinder illustrating a state in which a holding plate is provided to hold a lever while being inclined by a predetermined angle.

When only the workpiece B is allowed to pass through, the conventional technique requires the following necessity. The worker newly adds a holding plate 110 as shown in FIG. 25 to a lever 114 of a stopper cylinder 112. A bent section 116 of the holding plate 110 is used to fasten the lever 114 in a state of being inclined by a predetermined angle. That is, the bent section 116 of the holding plate 110 is allowed to abut against a flange 118 of the lever 114 so that rollers 120 may not rise to maintain the inclined state of the lever 114. Thus, the workpiece B is allowed to pass through.

On the contrary, in the case of the stopper cylinder 10 according to the embodiment of the present invention, when the worker manually tilts the lever 34, the pin member 90 of the lever 34 is engaged with the projection 98 of the bracket 86. Thus, it is possible to conveniently hold the lever 34 in the inclined state (see FIG. 20). As a result, any holding plate as described above is unnecessary for the stopper cylinder 10 according to the embodiment of the present invention, making it possible to further improve the degree of freedom of the handling operation.

What is claimed is:

1. A stopper cylinder provided with a lock mechanism for stopping a workpiece at a predetermined position by holding, at a predetermined position, a lever provided with rollers rotatably supported thereon, when said workpiece, which is conveyed in a predetermined direction, abuts against said rollers, said stopper cylinder comprising:

a main cylinder body;

a lever holder provided on an upper side of said main cylinder body, for rotatably supporting said lever to be rotatable by a predetermined angle;

a fastening pin member provided on a side surface of said lever, for making rotational displacement integrally with said lever; and a bracket rotatably supported on both side surfaces of said lever holder and provided with a guide section for making engagement with said fastening pin member, wherein:

an external force, which is applied in a direction opposite to said conveyance direction of said workpiece, causes rotational displacement of said bracket in accordance with a guiding action of said fastening pin member by the aid of said guide section, and thus said lever is released from a locked state.

2. The stopper cylinder according to claim 1, wherein a shock absorber is arranged at the inside of said main cylinder body, and said bracket is formed with a flat fastening section for locking said lever by pressing one end of said shock absorber and unlocking said lever by being disengaged from said one end of said shock absorber.

3. The stopper cylinder according to claim 1, wherein said main cylinder body comprises a cylinder tube, a rod cover and a head cover for closing both ends of said cylinder tube respectively to form cylinder chambers, a piston for making reciprocating movement along said cylinder chambers in accordance with an action of a pressure fluid supplied to said cylinder chambers, and said shock absorber detachably fitted and inserted into a piston rod coupled to said piston, for making displacement integrally with said piston.

4. The stopper cylinder according to claim 3, wherein an unlocking section is provided at a lower end of said bracket, and said lever is unlocked when said unlocking section abuts against an upper surface of said rod cover to press said bracket upwardly.

5. The stopper cylinder according to claim 1, wherein said bracket is provided with a projection for engaging with said fastening pin member to hold said lever in a state of being inclined by a predetermined angle.

6. The stopper cylinder according to claim 2, wherein said shock absorber comprises a rod member exposed to the outside to make abutment against said lever, and a ring member provided displaceably in an integrated manner together with said rod member, and said locked state is given by fastening said ring member by said fastening section of said bracket in accordance with a pressing action of said lever.

7. The stopper cylinder according to claim 1, wherein spring members are fastened to respective pin members for rotatably supporting said lever and said bracket respectively, and said lever and said bracket are urged to make approach to one another in accordance with an action of resilient forces exerted by said spring members.

8. The stopper cylinder according to claim 1, wherein said lever holder, which is provided for rotatably supporting said lever, is vertically movable in accordance with a displacement action of a piston accommodated in said main cylinder body.

* * * * *